Dec. 14, 1965 R. E. KNOX 3,223,388
APPARATUS FOR MIXING
Filed May 20, 1963
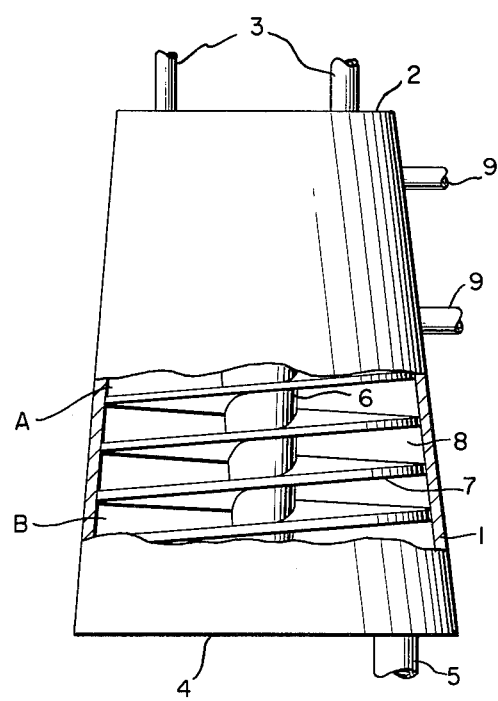
INVENTOR
ROGER E. KNOX
BY Robert C. Kline
ATTORNEY

3,223,388
APPARATUS FOR MIXING
Roger E. Knox, Claymont, Del., assignor to E. I. du Pont de Nemours and Company, Wilmington, Del., a corporation of Delaware
Filed May 20, 1963, Ser. No. 281,535
2 Claims. (Cl. 259—4)

This invention relates to a novel mixing apparatus and more particularly to a method of and an apparatus for producing polyurethane cellular materials. The novel apparatus is portable, has non-moving parts and depends on turbulent flow through a helical path for thorough mixing.

A wide variety of mixing equipment has been used in the polyurethane foam field since these products were first introduced. The commercially available mixers range from the very simple, such as the so-called "bent wire" mixer in which the reactants are mixed in a relatively narrow chamber by means of a rapidly rotating agitator consisting essentially of rigid loops of wire, to the more complicated mixers involving special equipment for injecting the components under high pressure into the reaction mass in order to ensure mixing and specially designed agitated vessels with valves adapted for quick opening and shutting. Another type of mixer involves mixing the components as finely divided droplets emitted from a spray gun. Typical mixers are described in U.S. Patent Nos. 2,730,433, 2,868,518, 2,948,928, 2,957,203, 2,990,380, 2,990,252, 3,031,271, 2,035,775 and 2,779,689.

It is an object of the present invention to provide a novel mixing apparatus. A further object is to provide a portable mixer having non-moving parts which is particularly adapted for preparing polyurethane cellular materials. A still further object is to provide a method for preparing polyurethane cellular materials wherein a novel portable mixer is employed. Other objects will appear hereinafter.

These and other objects are accomplished by providing a mixing apparatus comprising (1) An outer shell in the form of truncated cone with the top or smaller diameter of said cone having at least one inlet opening and the bottom or larger diameter having at least one outlet opening;

(2) A second truncated cone axially positioned within said outer shell and inverted in relation to said outer shell; and (3) A helical or spiral channel extending continuously throughout the axial length of said second cone in the area between said second cone and the inner surface of said outer shell so that one end of said channel communicates with said inlet opening and the other end with said outlet opening, said channel having a constantly increasing cross-sectional area from beginning to end.

The mixing apparatus may be illustrated by reference to the drawing which is a vertical sectional view, in which the outer shell truncated or tapered cone is designated by the numeral 1. The top 2 may be permanently or removably fastened to the outer shell by any conventional means. Thus it may be attached by screw threads for easy removal or on the other hand, it may be welded to the outer shell. Inlet ports in the top end are shown by the numeral 3. These ports are simply flush-mounted pipe nipples which may be connected to conventional sources of supply of components. The number of inlet ports is purely optional. The bottom plate of the outer shell 4 is removable and may be conveniently attached by screw threads. The bottom plate bears at least one discharge or outlet port 5. The inner truncated cone 6 which is inverted in relation to the outer shell truncated cone 1 may be of solid material or it may be hollow on the inside. It is maintained in position between top plate 2 and bottom plate 4 by compressive positioning of bottom plate 4. Supported on this truncated cone is a helical flight or fins of thin material 7 the outer perimeter of which is in contact with the inner wall of the outer shell. The number of fins on this truncated cone is optional depending on the length of the spiral channel desired. This helical flight then defines a helical or spiral channel 8 from the top plate to the bottom plate confined between the surfaces of the flight and the inner and outer truncated cones. The cross-sectional area of the passageway constantly increases due to the increasing distance between the inner and outer truncated cones as illustrated by letters A and B. Since the flight is helical, the distance between successive flights remains constant. In FIGURE 1 are shown optional inlet ports 9 through which additional components may be added. The choice of addition through inlet ports in the top plate or inlet ports through side openings in the outer shell depends upon the wishes of the operator. In some cases, it is desirable to give preliminary mixing to part of the components before an additional component is added.

The mixer may be constructed of a variety of materials. Suitable metals are steel, brass, aluminum, nickel, copper and many of the alloys commercially available such as various stainless steels, Monel metal, and the like. Plastic materials which are not affected by the reactants or solvents may be used in the construction. Glass fiber reinforced epoxy resins and polytetrafluoroethylene are typical of such plastics.

The rate of flow of material through the helical passageway is adjusted so that there is turbulent flow. If in the progress through the passageway a gas is either formed or introduced, the presence of bubbles in the liquid mass will assist in maintaining turbulence. Turbulent flow is a well recognized chemical engineering phenomenon and is usually characterized by having a Reynolds Number of at least about 3000. If desired, baffles may be inserted in the helical passageway to accentuate the turbulent flow by thus forming a multiplicity of restrictive orifices. These baffles are simply small fins extended between the helical surfaces and being attached either to the inner truncated cone or outer wall. Obviously, these baffles must not be big enough to throttle down the flow through the passageway. Such baffles are preferably spaced at random intervals in the passageway.

The exact dimensions of the mixer of this invention will depend upon the particular use to which it is to be put. Obviously, when larger flows are required, a larger size will be needed. This mixer may readily be adapted to the production of cellular materials. In this instance it may be used for either in-place foaming or complete portability in the field. On the one hand, it may be attached to permanently mounted apparatus for adding cellular precursor to forms on a production line; or it may be attached to the end of a hose and used in the field to apply foam as an insulation between partitions or it can be adapted to spray onto vertical or horizontal surfaces. This mixer is particularly useful for the preparation of the so-called froth type of polyurethane foam. One particularly useful arrangement for supplying the components of a foam to the mixer is illustrated in Chemical Engineering Progress, 57, pages 40–47, October 1961.

Polyurethane foams may be made from a wide variety of materials and may be made by either the "one-shot" or prepolymer process. Both of these processes and the wide variety of starting materials which may be used are well known in the art. The basis for polyurethane foams is usually either a polyether polyol or a polyester polyol. The polyester polyols are typified by polyalkyleneether glycols such as polypropyleneether glycol and polytetramethyleneether glycol; by polyether polyols such as those made by condensing glycerine, trimethylol propane, or pentaerythritol with propylene oxide or ethylene oxide or both and usually having a molecular weight of at least 500 and preferably about 1000. From a practical standpoint, the upper range of molecular weight is usually on the order of 3000 to 3500. Polyols having molecular weights higher than these are usually higher melting and more difficult to process. The polyesters are made by esterification of polybasic acids with polyhydroxy compounds. They are made by condensing basic acids with glycols; for example, ethylene glycol with adipic acid. Polyhydroxy esters are usually made by introducing a polyhydric alcohol, such as trimethylol propane, into the esterification reaction along with the glycols. The molecular weights of the polyesters should be in the same range as the polyethers above.

Various polyisocyanates may be used in preparing the polyurethanes. Typical polyisocyanates are toluene-2,4-diisocyanate, toluene-2,6-diisocyanate, naphthalene-1,5-diisocyanate, methylene bis(4-phenylisocyanate), phenylene diisocyanate, 4,4',4''-triphenylmethane triisocyanate, hexamethylene diisocyanate, and the isocyanate prepared by the phosgenation of the condensation product of aniline and formaldehyde, generally known as polymethylene polyphenyl isocyanate. The aromatic polyisocyanates are preferred.

The polyurethane foams may be made by either of the two general processes as mentioned above. In the case of the "one-shot" foams, each of the components may be introduced into the mixer through its own inlet port. In this case each inlet port is conveniently fitted with a check valve to prevent any backflow into the inlet port due to excess pressure. In the case of prepolymer foams, the polyether polyol and at least a portion of the polyisocyanate are reacted to form prepolymer. This prepolymer is then fed to the mixer in one stream and the other components are fed through one or more other inlet ports. If the prepolymer has isocyanate terminal groups, additional polyisocyanate may be blended directly with it before it is introduced into the mixer.

A wide variety of auxiliary agents is available for use in making polyurethane foams. Surface active agents are generally used to help control the cell size and cell structure. Polydimethyl siloxane and polydimethyl siloxane copolymerized with ethylene oxide and propylene oxide are two very frequently used surfactants. Catalysts are normally used to accelerate the reaction of the isocyanate group. Such catalysts are well known and typical examples are triethylene diamine, N-methylmorpholine, and dibutyl tin dilaurate.

The foam may be formed either by the carbon dioxide generated by the reaction of the free isocyanate group with water or it may be formed by an auxiliary foaming agent such as a readily volatile liquid or a normally gaseous material which is introduced under pressure. The use of a volatile fluorocarbon such as difluorodichloromethane as the foaming agent instead of, or in addition to, the carbon dioxide generated from the isocyanate and water has been adopted rather widely on the commercial scale.

The mixer may be used with a wide variety of feeding devices. The component feed may be measured to the mixer by means of a flowmeter or a metering pump. The source may be either directly from a holder or may be a take-off from a circulating line so that the feed may be maintained at a constant temperature. Both of these methods are well known in the polyurethane foam industry. The foam emitted from the product end of this mixer may be deposited directly into a mold or a cavity or it may be deposited on a surface. In the latter case, it may be desirable to use an annular stream of air to assist in particulating the froth or foam. The air may be introduced around the outer side of the outlet opening of the mixer.

It is general practice in the manufacture of polyurethane foam to flush out the equipment with a solvent after use. The solvent may conveniently be introduced through one of the top ports of this mixer from a suitable supply.

The invention will be more thoroughly described by the following examples in which all parts are parts by weight unless otherwise stated; however, the invention is not intended to be limited to these examples.

EXAMPLES

Apparatus

The apparatus used in the following examples is described in connection with the drawing. The outer shell 1, is made of stainless steel and is 6 inches in height. The diameter at the top of the truncated cone is 2¼ inches and the diameter at the bottom is 3 inches. The two inlet ports, 3, are ⅜ inch in diameter. The discharge port, 5, is ½ inch in diameter. One side port, 9, near the upper end of the cone is ¼ inch in diameter. The helix, 7, inside the shell is made of 0.05 inch thick stainless steel with 0.20 inch vertical distance between the flights. The depth of the flight increases from a minimum of 0.5 inch in the first flight at the top of the helix to 1.0625 inches on the last flight at the bottom of the helix. There are 20 turns on the helix. The total internal free volume of the mixer is 19 cubic inches. The cross-sectional area of the helical passageway at the beginning is 0.10 square inch. At the end is 0.2125 square inch. The median helical passage length is approximately 140 inches.

EXAMPLE 1

A. Three streams were fed to the mixer in the proportions indicated. Stream 1 consisted of 36.5 parts of a polyether having a molecular weight of approximately 500 made by condensing propylene oxide with sorbitol, 25 parts of monofluorotrichloromethane, 0.25 part of triethylene diamine and 0.7 part of a polydimethyl siloxane/ethylene oxide/propylene oxide block copolymer, as described in Belgian Patent 603,552, hereafter called Surfactant A. Stream 2 consists of 50 parts of the condensation product of the sorbitol polypropyleneether polyol above and toluene-2,4-diisocyanate containing 28% free NCO groups. Stream 3 consists of 4 parts of difluorodichloromethane. These three streams were fed to the mixer in the above proportions. Streams 1 and 2 were fed through the top plate and Stream 3 through the side port at a total rate of 8 lb./min. The product coming from the outlet was in the form of a froth having a density of 12 lb./cu. ft. This froth expanded and set to a tack-free state in about 3 minutes. The foam was rigid, had a very uniform cell structure, and had a density of 1.3 lb./cu. ft.

B. The above run is repeated except that Stream 3 is omitted. In this case the discharge is all liquid and is poured into a mold where it foams up to form a rigid foam of density 1.6. It has a fine cell structure.

C. In this example Streams 1 and 2 were the same as in Part A above but instead of Stream 3 there was introduced about 2 cu. ft./min. of air through the side inlet port. Otherwise the flows remained the same. The discharge was a liquid with some fine air bubbles in it. It was poured into a mold where it foamed up to give a rigid foam of density 1.6 lb./ft. It had a fine cell structure.

EXAMPLE 2

A. The following streams were fed to the mixer. Stream 1—127 parts of crude methylene bis(4-phenyl isocyanate), 28.2%—NCO; Stream 2—a mixture of 100 parts of sorbitol polypropylene oxide condensation product of molecular weight 500, 2 parts Surfactant A, 0.5 part triethylene diamine, 0.2 part dibutyl tin dilaurate and 30 parts of fluorotrichloromethane; Stream 3—10 parts difluorodichloromethane. The total flow was at a rate of 9 lb./min. The discharge was a froth of density of 12 lb./cu. ft. It expanded to a fine cell, rigid structure foam in about 2 minutes which had a density of 1.8 lb./cu. ft.

B. The formulation of this run was the same as above except that Stream 1 consisted of 137 parts and to Stream 2 was added 5 parts of N,N,N',N'-tetra-kis(2-hydroxypropyl)ethylene diamine. The froth density was 11 lb./cu. ft. The final foam has the same appearance as the above and had a density of 1.8 lb./cu. ft.

C. Run B was repeated except that Stream 3 was omitted. The discharge was a liquid which was poured into a mold where it foamed up to form a rigid foam with a medium to coarse cell structure of density of 2.6 lb./cu. ft.

D. Run B was repeated except that air at the rate of 2 cu. ft./min. was introduced into the side inlet port instead of Stream 3. The liquid issuing from the mixer was milky with fine air bubbles. It was poured into a mold where it foamed up to form a rigid foam of fine cell structure with a density of 2.62 lb./cu. ft. In this instance, the air acted as a nucleating agent to improve the quality of the cell structure.

E. Run B above was repeated insofar as the formulation and mixing was concerned. However, the discharged froth was sprayed onto a vertical surface by using an annular stream of air to particulate the froth. In this procedure the froth is introduced into a nozzle where a surrounding annular air stream is established through parallel air ports which particulates the froth stream and improves the smoothness of the deposition on a surface. This procedure does not alter the cell structure. The foam density remained at 1.8 lb./cu. ft. The foam had a fine uniform cell structure.

EXAMPLE 3

A. To the mixer were fed the following two streams; Stream 1—100 parts of a polyether with a hydroxyl number 48 consisting of a glycerine condensed with propylene oxide part of which was capped with ethylene oxide blended with polypropyleneether glycol, 2.5 parts of a polydimethane siloxane polyalkyleneether block copolymer described in Example 1A of U.S. Patent 2,834,748, 0.3 part of tin octanoate, 0.2 part of triethylene diamine, and 4.5 parts of water; Stream 2—54 parts of a mixture of 80% toluene-2,4-diisocyanate and 20% toluene-2,6-diisocyanate. A milky liquid issued from the outlet at a rate of about 11 lb./min. It foamed up into a resilient foam in about 3 minutes becoming non-sticky. The density of the final foam was 1.8 lb./cu. ft. It had a fine uniform cell structure.

B. The above formulation was changed slightly by increasing the tin octanoate in Stream 1 to 0.35 part and Stream 3 consisting of 6 parts of difluorodichloromethane was added in the side port. In this experiment the discharge was in the form of a froth of a density of approximately 15 lb./cu. ft. which foamed up into a resilient foam having a density of 1.7 lb./cu. ft. It had a fine cell structure.

As many widely different embodiments of this invention may be made without departing from the spirit and scope thereof, it is to be understood that this invention is not limited to the specific embodiments thereof except as defined in the appended claims.

What is claimed is:
1. A mixing apparatus comprising
   (1) an outer shell in the form of truncated cone with the top or smaller diameter of said cone having at least one inlet opening and the bottom or larger diameter having at least one outlet opening;
   (2) a second truncated cone axially positioned within said outer shell and inverted in relation to said outer shell; and
   (3) a helical or spiral channel extending continuously throughout the axial length of said second cone in the area between said second cone and the inner surface of said outer shell so that one end of said channel communicates with said inlet opening and the other end with said outlet opening, said channel having a constantly increasing cross-sectional area from beginning to end.
2. The mixing apparatus of claim 1 wherein the outer shell contains at least one side inlet opening.

References Cited by the Examiner
UNITED STATES PATENTS

| 1,189,478 | 7/1916 | Pfouts | 259—4 |
| 1,834,917 | 12/1931 | Gilchrist | 259—180 |

WALTER A. SCHEEL, *Primary Examiner.*
CHARLES A. WILLMUTH, *Examiner.*